(12) United States Patent
Martinez et al.

(10) Patent No.: US 6,270,131 B1
(45) Date of Patent: Aug. 7, 2001

(54) PARTITIONED IMPACT ABSORBER MADE OF TWO INTERFITTING BLOCKS, AND A BUMPER BEAM INCLUDING SUCH AN IMPACT ABSORBER

(75) Inventors: Bernard Martinez, Nurieux Volognat; Olivier Cornet, Bourg en Bresse, both of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/517,854

(22) Filed: Mar. 2, 2000

(30) Foreign Application Priority Data

Mar. 5, 1999 (FR) .................................................. 99 02769

(51) Int. Cl.$^7$ ................................. B60R 19/34; F16F 7/12
(52) U.S. Cl. ........................... 293/132; 293/133; 188/371
(58) Field of Search .................................... 188/371, 374, 188/376, 377; 267/139; 293/132, 133, 136, 154, 155

(56) References Cited

U.S. PATENT DOCUMENTS

| | | | | |
|---|---|---|---|---|
| 3,926,463 | * | 12/1975 | Landwehr et al. | 293/136 |
| 3,997,207 | * | 12/1976 | Norlin | 293/110 |
| 4,029,350 | * | 6/1977 | Goupy et al. | 293/110 |
| 4,154,469 | * | 5/1979 | Goupy et al. | 293/120 |
| 4,227,593 | | 10/1980 | Bricmont et al. | 188/1 C |
| 4,252,355 | * | 2/1981 | Goupy et al. | 293/120 |
| 4,533,166 | * | 8/1985 | Stokes | 293/120 |
| 5,219,197 | * | 6/1993 | Rich et al. | 293/120 |
| 5,425,561 | * | 6/1995 | Morgan | 293/120 |
| 5,507,540 | * | 4/1996 | Pernot | 293/102 |
| 5,746,419 | * | 5/1998 | McFadden et al. | 267/140 |
| 5,806,889 | | 9/1998 | Suzuki et al. | 280/748 |

FOREIGN PATENT DOCUMENTS

| | | |
|---|---|---|
| 0 705 994 A2 | 4/1996 | (EP) . |
| 2 691 124 A1 | 11/1993 | (FR) . |

\* cited by examiner

Primary Examiner—Joseph D. Pape
Assistant Examiner—Paul Chenevert
(74) Attorney, Agent, or Firm—Oliff & Berridge, PLC

(57) ABSTRACT

A partitioned impact absorber comprising an array of partitions extending parallel to a given impact direction. The absorber is constituted by at least two mutually-engageable blocks, each block having partitions, the partitions of each block interfitting between the partitions of the other block so as to build up the array of partitions of the absorber.

13 Claims, 4 Drawing Sheets

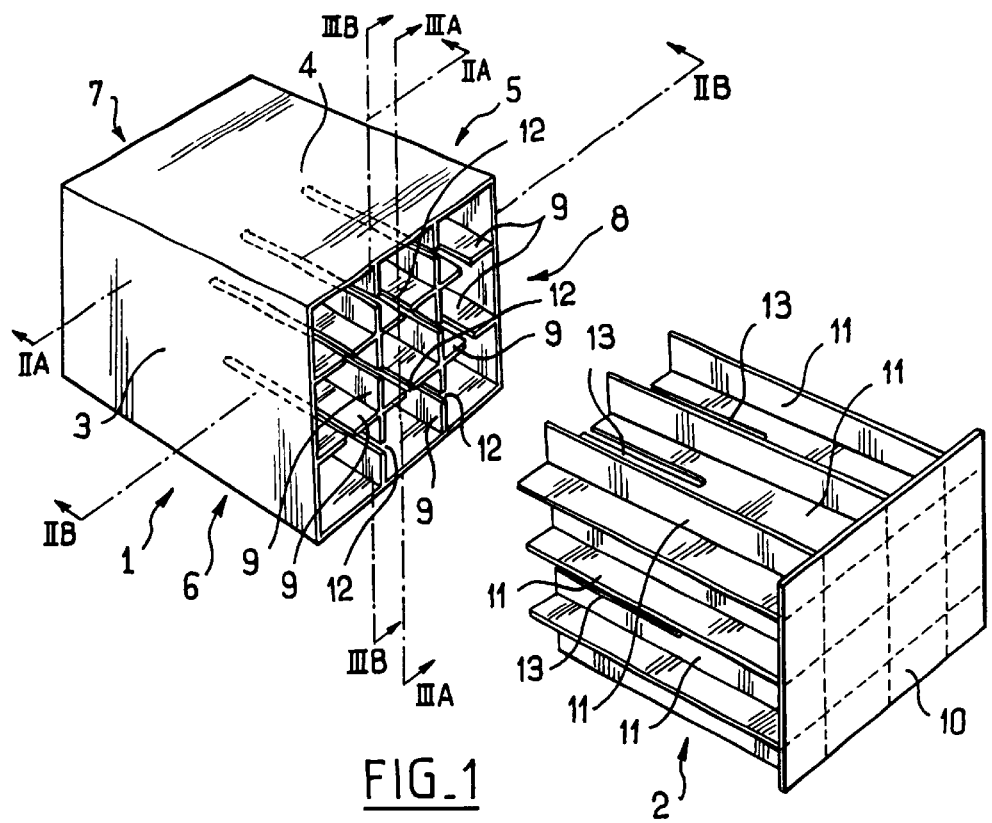
FIG_1
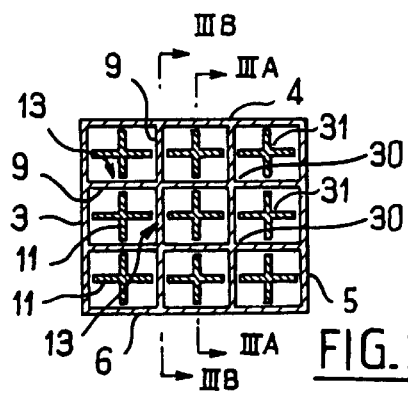
FIG_2A
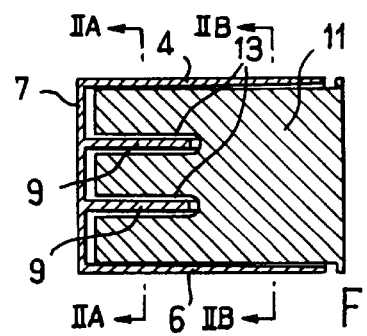
FIG_3A
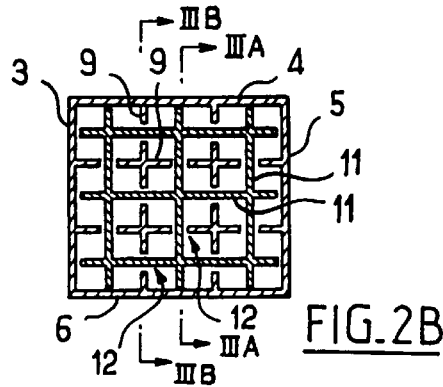
FIG_2B
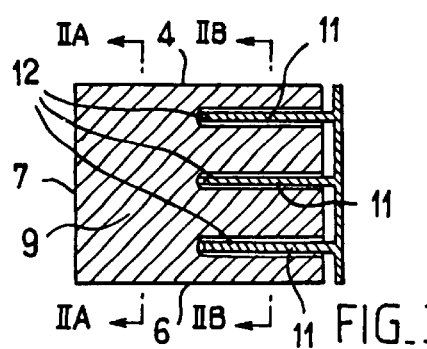
FIG_3B

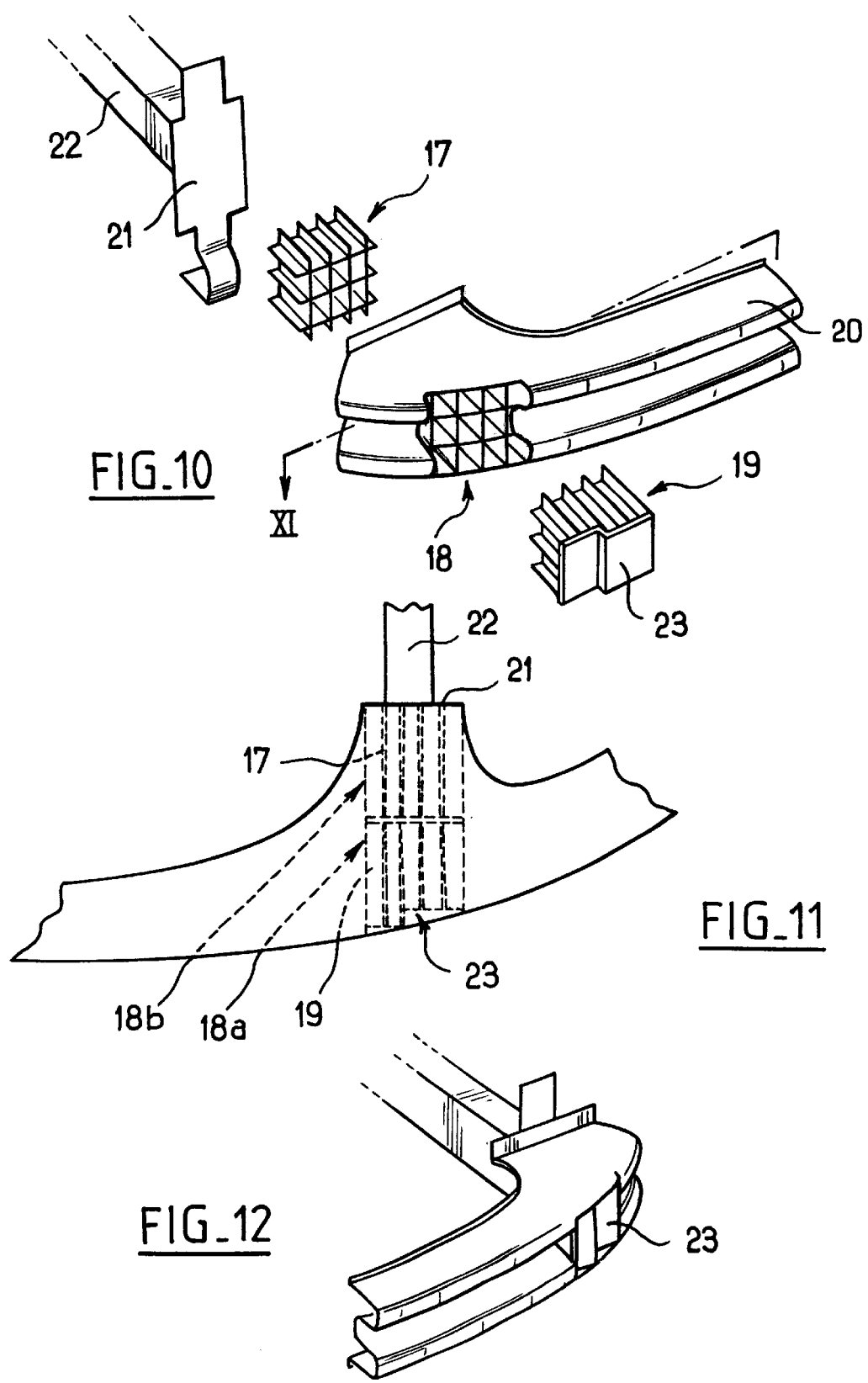

PARTITIONED IMPACT ABSORBER MADE OF TWO INTERFITTING BLOCKS, AND A BUMPER BEAM INCLUDING SUCH AN IMPACT ABSORBER

The present invention relates to a partitioned impact absorber made of two interfitting blocks, and to a bumper beam including such an impact absorber.

BACKGROUND OF THE INVENTION

Partitioned impact absorbers are already known, being honeycomb-type structures comprising an array of partitions extending parallel to a predetermined "impact" direction, and which deform in the event of an impact, thereby absorbing the energy thereof.

By way of example, such impact absorbers are used for mounting bumper beams to vehicle structures or they are mounted directly to the structure of the vehicle. When the impact absorber is subjected to an impact directed substantially along the axis of the vehicle, the bumper beam moves towards the inside of the vehicle and the energy transmitted by the bumper beam is absorbed by the impact absorbers so as to protect the remainder of the vehicle and above all its passengers.

Until now, partitioned impact absorbers have generally been obtained by extrusion or by injection.

When obtained by injection, there is a lower limit on the pitch of the array of partitions, i.e. on the distance between two adjacent partitions in the array, because the injection mold and in particular the cores which separate the partitions, must present at least some minimum thickness below which they would not withstand the very high injection pressure that needs to be exerted in order to fill completely the cavities in the mold between the cores and defining the volume in which said partitions are made.

With injection, the pitch of the array must also be larger with increasing depth of the partitions in the impact direction. Unfortunately, this correlation between partition depth and array pitch as imposed by the injection process is particularly unfavorable to the effectiveness of the absorber.

Ideally, in order to be effective during a high-energy impact, the depth of the partitions should be large and simultaneously the size of the cells, i.e. the pitch of the array, should be small.

In addition, there is another characteristic of injected absorbers that reduces their effectiveness: the fact that the partitions must be of tapering thickness towards the ends of the cores so as to enable the absorber to be unmolded. The consequence of this characteristic is that the resistance opposed by the absorber increases with increasing depth of compression, which phenomenon is referred to as the taper phenomenon, whereas more energy would be absorbed if the resistance opposed by the absorber was at its maximum from the beginning of its deformation.

As a result, previous molded impact absorbers provide energy absorption conditions that are not satisfactory because of the relatively low density of their arrays of partitions and because their efficiency is diminished by the taper effect.

OBJECTS AND SUMMARY OF THE INVENTION

The present invention seeks to provide a solution whereby partitioned impact absorbers can be made by molding, while nevertheless having a high-density array of partitions and a taper effect that is limited.

The present invention provides a partitioned impact absorber comprising an array of partitions extending parallel to a given impact direction, the absorber being constituted by at least two mutually-engageable blocks, each block having partitions, the partitions of each block interfitting between the partitions of the other block so as to build up the array of partitions of the absorber.

In other words, the present invention consists in making two blocks each having its own array of partitions at relatively low density, thus enabling them to be made by molding, and in interfitting the two blocks one in the other so that their partitions are interleaved, thereby effectively doubling the density of the resulting partition array.

In a preferred embodiment of the invention, each block comprises a number of partitions that is substantially half the total number of partitions constituting the array of partitions of the absorber, said array in a direction perpendicular to the impact direction comprising, in alternation, a partition from one block and a partition from the other block.

In a particular embodiment of the invention, the thickness of the partitions of each block tapers towards the other block, which enables the block to be made by molding and which enables each partition to be given a taper that facilitates unmolding of the block.

Given that the two blocks are interfitted in mutually opposite directions, the thin ends of the partitions in each block are adjacent to the thick ends of the partitions in the other block, such that at any cross-section of the absorber, the average thickness of the partitions is constant.

In this way, the absorber is caused to be very uniform, thus giving rise to optimum efficiency in the face of impact, given that the resistance opposed by the absorber is substantially constant while it is being compressed.

This characteristic makes it possible to eliminate the phenomenon referred to as the taper effect.

In a preferred embodiment of the invention, the partitions of each block are split over half their length so as to enable them to be interlocked with the partitions of the other block.

Thus, two perpendicular partitions, one belonging to the first block and the other to the second block, can hold each other mutually, with the slot in each partition receiving the unslotted portion of the other partition, and vice versa.

In a variant of this embodiment, on the border of its slot, each partition has stiffening ribs having the function of compensating for the weakening due to the presence of the slot and of keeping the partition and the partition that engages in the slot mutually perpendicular. This partition can additionally include ribs on either side of its region that is to be held captive in the slot, so as to prevent said region in the slot from moving and so as to keep the partitions mutually perpendicular.

In a particular embodiment of the invention, the absorber is constituted by:

a first block having a first set of partitions;

a second block having a first side carrying a second set of partitions suitable for interfitting with the first set of partitions by the first block being engaged in the first side of the second block, and a second side opposite from its first side and carrying a third set of partitions; and a third block having a fourth set of partitions suitable for interfitting with the third set of partitions by the third block engaging in the second side of the second block.

Such a three-block absorber can also be defined as being constituted by two impact absorbers each comprising two mutually-engaged blocks, with one of the blocks of the first impact absorber being secured back to back with one of the blocks of the second impact absorber so as to form the second block as defined above.

Such a three-block impact absorber presents the advantage of being capable of extending over a relatively long distance in the impact direction, because the length of each of its partitions is, in fact, only half the total length of the absorber.

The present invention also provides a bumper beam including an integrated impact absorber, the bumper beam including a portion constituting one of the blocks of the impact absorber as defined above.

In a particular embodiment, the beam is associated with a block additional to that constituted by a portion of the beam, and this additional block presents, on its front face opening towards the front of the vehicle, a staircase-shaped wall comprising only portions that are perpendicular to the partitions of the block, which portions are interconnected by portions parallel to the partitions of the blocks.

The staircase-shape enables the front wall of the additional block to follow substantially the curvature of the front face of the beam while preserving the blocks from the oblique stresses that would impede proper effectiveness of the absorber.

Such a beam can include, in particular, a three-block impact absorber. In which case, the block which is integrally formed with the beam is the second block, i.e. the block having a first side carrying the second set of partitions and a second side, opposite from the first, carrying the third set of partitions.

BRIEF DESCRIPTION OF THE DRAWINGS

In order to make the invention better understood, there follows a description of embodiments given as examples that do not limit the scope of the invention, and described with reference to the drawings, in which:

FIG. 1 is an exploded perspective view of an impact absorber constituting a first embodiment of the invention;

FIGS. 2A and 2B are cross-sections on IIA—IIA and IIB—IIB of the absorber in the assembled state;

FIGS. 3A and 3B are longitudinal sections on IIIA—IIIA and IIIB—IIIB of the same absorber in the assembled state;

FIG. 10 is an exploded perspective view of the front right portion of the structure of a motor vehicle;

FIG. 11 is a section view on XI—XI of FIG. 10;

FIG. 12 is a perspective view of the front left structure of the vehicle in the assembled state;

MORE DETAILED DESCRIPTION

Figure 4:
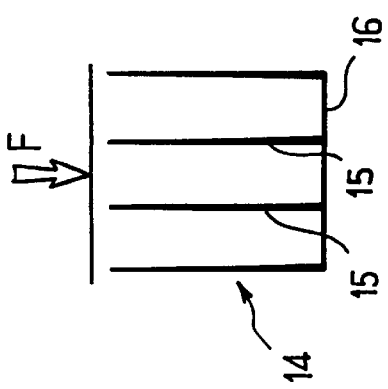
FIG. 4 is a diagram of an impact absorber of the prior art taken by way of comparison.

The outside shape of the absorber shown in FIG. 1 is that of a rectangular parallelepiped. The absorber comprises two blocks, a "female" block 1, and a "male" block 2.

The female block 1 has four large side faces 3, 4, 5, and 6, and a small face 7 at one end only. Its opposite end 8 is open. On the inside it is provided with an array of partitions 9 which extend from its small face 7 parallel to its large faces, and which are consequently mutually perpendicular.

Between them, the partitions define square-section cells.

Naturally, it would not go beyond the ambit of the invention to design an absorber having cells of some other section, e.g. hexagonal, rectangular, triangular, or circular.

The pitch of the array of partitions in the female block is compatible with said block being made by molding.

The male block 2 has a single small face 10 and an array of partitions 11 extending from said small face perpendicularly to the impact direction and defining between them cells of square section.

The spacing between pairs of partitions, i.e. the pitch of the array, is identical in the female block 1 and the male block 2, however the positioning of the partitions on the small face that support them is offset by half a pitch step in both transverse directions parallel to the partitions.

The partitions of each block taper towards the other block, thereby providing taper that is useful in enabling each of the blocks to be unmolded, however the thin portions of the partitions in each block are adjacent to the thick portions of the partitions of the other block, thereby providing mutual compensation.

In their halves situated adjacent to the other block, the partitions 9, 11, of each of the blocks have respective longitudinal slots 12, 13 opening out towards the other block.

These slots enable the partitions to interlock in pairs when the male block is engaged in the female block, thereby stiffening the resulting absorber.

In the exemplary embodiment shown in FIG. 2A, some of the partitions 9 of the female block 1 define cruciform cross-sections 30 and some of the partitions 11 of the male block 2 define cruciform cross-sections 31.

FIGS. 2A and 2B show that the array of partitions in the absorber presents a density of partitions that is twice that of the density of either block.

Figure 5:
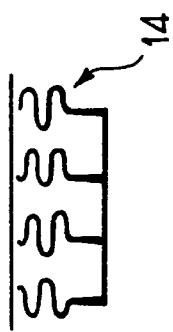
FIG. 5 is a view analogous to FIG. 4 but after the impact absorber has been compressed.
Figure 6:
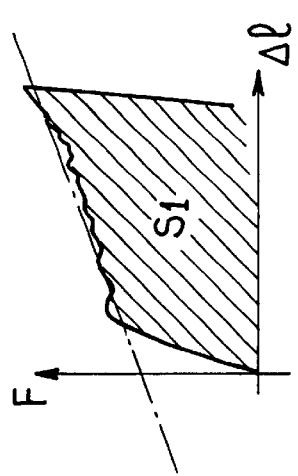
FIG. 6 is a graph showing the effect of taper on the prior art impact absorber.

FIGS. 4 to 6 show a comparative example between an absorber 14 having a single block of partitions 15 of thickness that tapers going away from their bases 16 because of the need to enable the absorber to be unmolded.

A frontal impact on the absorber causes a force F to be exerted thereon which comprises the absorber until it has been brought into the position shown in FIG. 5.

The graph of FIG. 6 shows the force F that needs to be exerted on the absorber in order to decrease its length by an amount $\Delta l$.

It can be seen that the curve relating said force to the shortening of the absorber has a substantially sloping portion (chain-dotted line) representing the taper effect.

For relatively small compression force, the partitions of the absorber begin by deforming in their thinner end portions.

As the length of the absorber decreases, deformation extends into thicker portions of the partitions, until some maximum compression force is reached.

This taper effect reduces the effectiveness of the absorber, which is represented in FIG. 6 by a trapezium-shaped area S1 between the force curve and the abscissa.

With the impact absorber of FIGS. 1 to 3, this taper effect is eliminated.

Figure 7:
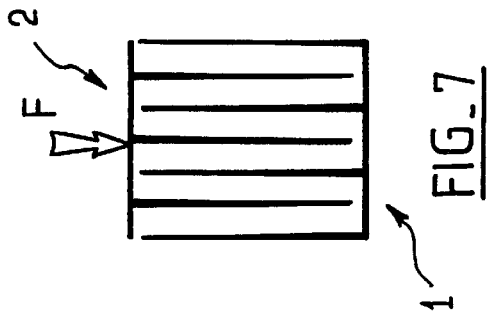
FIG. 7 is a diagrammatic view of the impact absorber of FIGS. 1 to 3.
Figure 8:
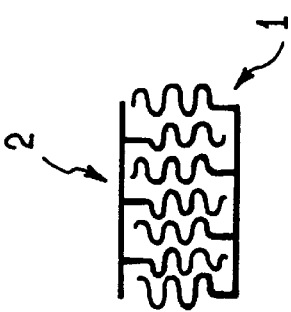
FIG. 8 is a view analogous to FIG. 7, showing the impact absorber after compression.

The absorber which is shown in the undeformed state in FIG. 7 and in the deformed state in FIG. 8 provides a curve of force as a function of deformation that has a "flat" (chain-dotted line), which means that the force exerted on the absorber in order to deform it is substantially constant regardless of how much the absorber has already been deformed.

Figure 9:
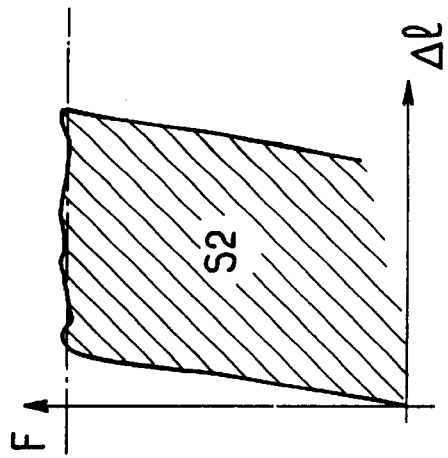
FIG. 9 is a graph showing the absence of any taper effect on the absorber.

Consequently, the absorber is effective from the beginning of deformation, which is represented in FIG. 9 by an area S2 which is substantially rectangular.

Since there are twice as many partitions, for given outside dimensions, it is necessary to exert twice as much force as before to deform the absorber.

In the embodiment of FIGS. 10 to 12, the impact absorber is built up of three blocks 17, 18, and 19, one of these blocks (18) forming an integral portion of a bumper beam 20.

The assembly is mounted on a metal plate 21 forming part of the structure 22 of a vehicle.

The three-block structure 17, 18, and 19 of the impact absorber is more clearly visible in FIG. 11 where it can be seen that the block 18 which forms an integral portion of the beam 20 in fact comprises two female blocks 18a and 18b placed back to back, one facing towards the front of the vehicle and the other towards the rear, i.e. towards its structure.

Each of these two blocks is designed to have a male outer block 17, 19 received therein.

The front male block 19 is referred to as the first block, while the rear male block is referred to as the third block.

This three-piece structure of the absorber makes it possible to achieve lengths in the axial direction of the vehicle that are quite long for a partitioned impact absorber, i.e. up to about 300 mm.

It will be observed that the front wall 23 of the second block 18 is given a staircase-shape so as to avoid projecting through the front face of the beam.

This optional staircase-shape (depending on the curvature of the beam) is intended to ensure that the front wall is made up only of portions that are parallel or perpendicular to the partitions so that in the event of the beam being subjected to a frontal impact in line with the structure 22, the effect of the impact on the absorber does not give rise to a compression force that has a component that is oblique because of the curvature of the beam where it overlies the absorber.

Such an oblique component could cause the absorber to collapse by folding like a deformable parallelogram.

The front face of the block 19 which supports its array of partitions is likewise given a staircase-shape.

Figure 13:
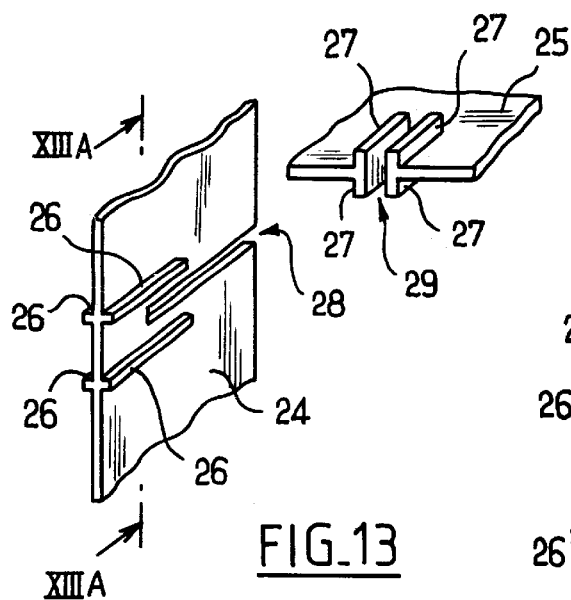
FIG. 13 is a close-up perspective view of a portion of the partitions of an absorber constituting another embodiment of the invention.
Figure 13A:
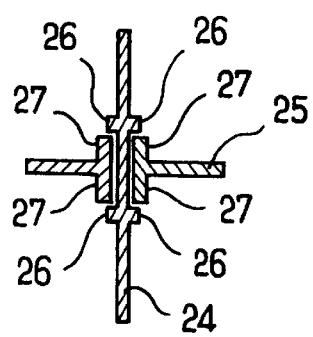
FIG. 13A is a section view on XIIIA—XIIIA of the FIG. 13 absorber.

In the embodiment of FIGS. 13 and 13A, the partitions 24 and 25 of each block are provided with stiffening ribs 26, 27 in the vicinity of their slots 28, 29.

More precisely, on either side of its slot 29, each partition 25 has stiffening ribs 27 which have the functions of compensating for the weakness imparted to the partition by the presence of the slot, and of maintaining the partition 25 perpendicular relative to the partition 24 which engages in the slot 29.

For its part, on either side of its region that is to be engaged in the slot 29 of the other partition 25, each partition 24 has ribs 26 with the function of preventing said region from moving in the slot 29 while maintaining perpendicularity between the two partitions.

Figure 14:
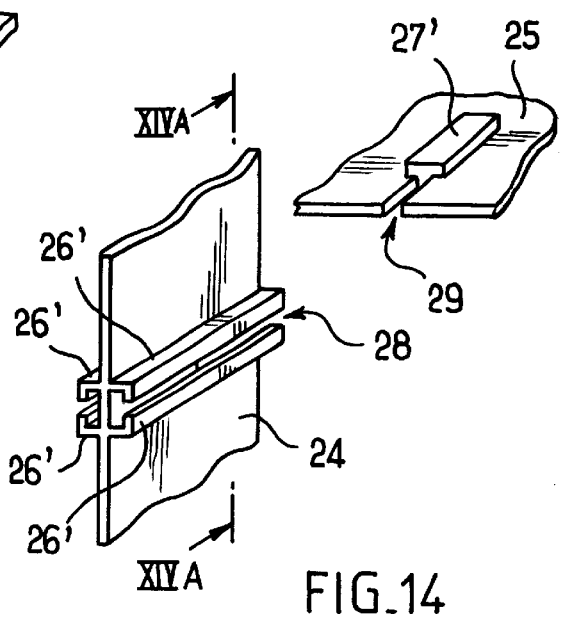
FIG. 14 is a close-up and perspective view of a portion of the partitions of an absorber of another embodiment of the invention.
Figure 14A:
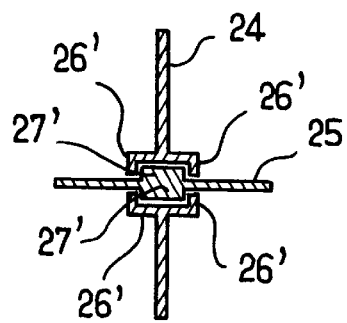
FIG. 14A is a section view on XIVA—XIVA of the FIG. 14 absorber.

In the embodiment of FIGS. 14 and 14A, there can be seen the same component parts as above, the ribs 26' and 27' being shaped in a different manner so as to increase the stiffness of the partitions in the vicinity of the slots by improving the way in which the ribs 26' and 27' interfit.

Naturally, the embodiments described above are not limiting in any way and can be modified in any desirable manner without thereby going beyond the ambit of the invention.

What is claimed is:

1. A partitioned impact absorber comprising an array of partitions extending parallel to a given impact direction, the absorber being constituted by at least two mutually-engageable blocks, each block having partitions connected together, said partitions defining cells, each cell being delimited by a couple of pairs of walls, the partitions of each block interfitting between the partitions of the other block so as to build up the array of partitions of the absorber.

2. An absorber according to claim 1, wherein each block comprises a number of partitions that is substantially half the total number of partitions constituting the array of partitions of the absorber, said array in a direction perpendicular to the impact direction comprising, in alternation, a partition from one block and a partition from the other block.

3. An absorber according to claim 1, wherein the partitions of each block are slotted over half their length so as to enable them to interlock with the partitions of the other block.

4. An absorber according to claim 3, wherein, on the border of its slot, each partition has stiffening ribs having the function of compensating for the weakening due to the presence of the slot and of keeping the partition and the partition that engages in the slot mutually perpendicular.

5. An absorber according to claim 4, wherein each partition has ribs on either side of its region that is to be held captive in the slot of the other partition so as to prevent said region in the slot from moving and so as to maintain perpendicularity between the two partitions.

6. A bumper beam including a first block of a partitioned impact absorber, wherein:

said impact absorber comprises an array of partitions extending parallel to a given impact direction, the absorber being constituted by said first block and at least a second block, said first and second blocks being mutually-engageable, each block having partitions connected together, said partitions defining cells, each cell being delimited by a couple of pairs of walls, the partitions of each block interfitting between the partitions of the other block so as to build up the array of partitions of the absorber, said first block is constituted by a portion of said bumper beam.

7. A bumper beam according to claim 6, wherein said second block has, on its front face opening towards the front of the vehicle, a staircase-shaped wall comprising only portions that are perpendicular to the partitions of said second block, said portions being interconnected by portions parallel to the partitions of the blocks.

8. A partitioned impact absorber comprising an array of partitions extending parallel to a given impact direction, the absorber being constituted by at least two mutually-engageable blocks, each block having partitions, the partitions of each block interfitting between the partitions of the other block so as to build up the array of partitions of the absorber, wherein the thickness of the partitions of each block tapers towards the other block.

9. A partitioned impact absorber comprising an array of partitions extending parallel to a given impact direction, the absorber being constituted by at least two mutually-engageable blocks, each block having partitions, the partitions of each block interfitting between the partitions of the other block so as to build up the array of partitions of the absorber, wherein said absorber includes:

a first block having a first set of partitions;

a second block having a first side carrying a second set of partitions suitable for interfitting with the first set of partitions by the first block being engaged in the first side of the second block, and a second side opposite from its first side and carrying a third set of partitions; and a third block having a fourth set of partitions suitable for interfitting with the third set of partitions by the third block engaging in the second side of the second block.

10. A partitioned impact absorber comprising an array of partitions extending parallel to a given impact direction, the absorber being constituted by at least two mutually-engageable blocks, each block having partitions, the partitions of each block interfitting between the partitions of the other block so as to build up the array of partitions of the absorber, wherein partitions of each block define cruciform cross-sections.

11. A partitioned impact absorber comprising an array of partitions extending parallel to a given impact direction, the absorber being constituted by at least two mutually-engageable blocks, each block having partitions, the partitions of each block interfitting between the partitions of the other block so as to build up the array of partitions of the absorber, wherein each block has four walls which are connected together to define a rectangle parallelepiped-shaped volume, said volume containing partitions of the same block.

12. An absorber according to claim 1, wherein said impact absorber has a bumper beam, wherein one of said blocks has, on its front face, a wall separate from the bumper beam and which defines a wall portion of said bumper beam.

13. An absorber according to claim 1, wherein all of the partitions of at least one of said blocks extend from a rail of the vehicle frame.

* * * * *